United States Patent [19]

Steppe

[11] Patent Number: 4,780,305
[45] Date of Patent: Oct. 25, 1988

[54] DUAL COMBUSTION OXYGEN-ENRICHED CLAUS SULFUR PLANT

[75] Inventor: Robert J. Steppe, Los Angeles, Calif.

[73] Assignee: The Ralph M. Parsons Company, Pasadena, Calif.

[21] Appl. No.: 914,777

[22] Filed: Oct. 3, 1986

[51] Int. Cl.$^4$ .............................................. C01B 17/04
[52] U.S. Cl. .................................................. 423/574 R
[58] Field of Search ........... 423/574 R, 574 G, 573 G

[56] References Cited

U.S. PATENT DOCUMENTS

| 1,984,971 | 12/1934 | Herold et al. | 423/574 G |
| 2,760,848 | 8/1956 | Dunning | 423/574 G |
| 3,637,352 | 1/1972 | Bratzler et al. | 423/574 G |
| 4,038,036 | 7/1977 | Beavon | 423/574 R |

FOREIGN PATENT DOCUMENTS 7703915 10/1977 Netherlands .................. 431/173

OTHER PUBLICATIONS

Chemistry, Bailar, Jr. et al, Academic Press, 1978, pp. 420–421.

Primary Examiner—John Doll
Assistant Examiner—Jeffrey Edwin Russel
Attorney, Agent, or Firm—Christie, Parker & Hale

[57] ABSTRACT

The thermal oxidation or combustion step of the modified Claus process is split into two combustion steps with intermediate cooling of the products of combustion from the first combustion step in order to limit the combustion zone flame temperature to less than 3600° F. when using an oxygen rich feed containing more than 30 percent oxygen in order to complete the partial oxidation of the sulfur producing by modified Claus reactions:

$$3H_2S + 1\tfrac{1}{2}O_2 \rightarrow 2H_2S + SO_2 + H_2O$$

$$2H_2S + SO_2H_2O \rightleftharpoons 3S + 3H_2O$$

20 Claims, 1 Drawing Sheet

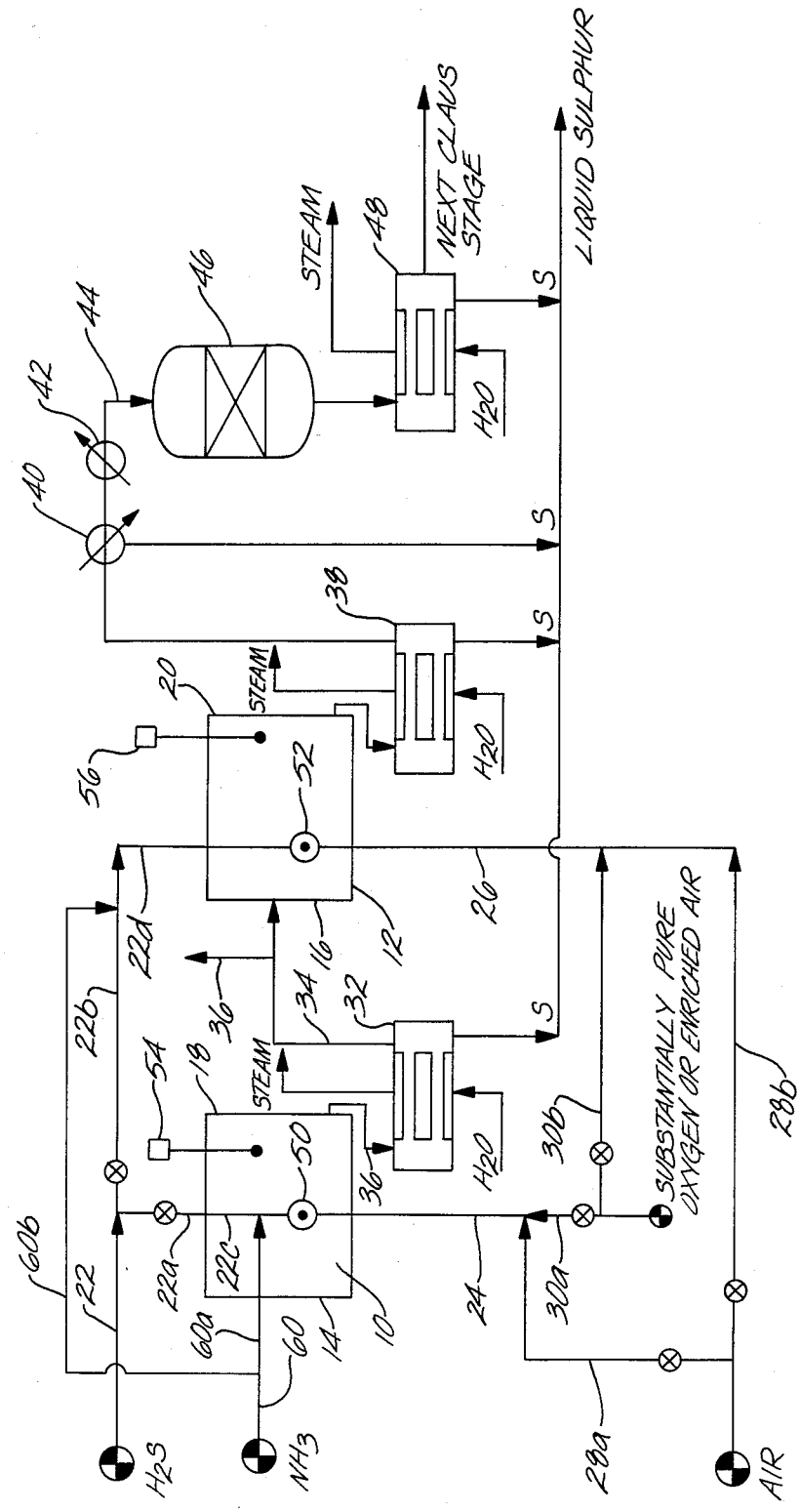

DUAL COMBUSTION OXYGEN-ENRICHED CLAUS SULFUR PLANT

BACKGROUND OF THE INVENTION

The sulfur present in hydrocarbon crudes including natural gas exists as hydrogen sulfide or, in the initial processing steps, is converted in the main to hydrogen sulfide. The hydrogen sulfide, as part of the gas stream, is normally passed through an absorption system, such as an alkanolamine or a physical absorbent, which concentrates it and separates it from other components of the gas stream. The concentrated hydrogen sulfide gas stream is fed to a Claus plant wherein a portion of the hydrogen sulfide is combusted in the presence of oxygen introduced as air, to form sulfur dioxide in proportions for the reaction:

$$2H_2S + SO_2 \rightarrow 3S + 2H_2O$$

As fast as sulfur dioxide is formed, it begins to react with hydrogen sulfide in the thermal reaction zone to form sulfur. Sulfur formed is condensed from the gas stream in a waste heat boiler and the balance of the gas stream, at the proper stoichiometric ratio of hydrogen sulfide to sulfur dioxide, is passed to one or more catalytic conversion zone(s), typically three, where additional sulfur is formed by the same reaction. As thermodynamics favor reaction at reduced temperatures, only a limited amount of conversion is achieved in each catalytic bed. The formed sulfur is recovered by condensation and the gas reheated for introduction to a following catalytic bed. The catalysts typically used are alumina or bauxite. Conversion efficiencies of from 95% to 97% can be achieved in the Claus plant and, if pollution requirements so dictate, a clean-up operation such as that described in U.S. Pat. No. 3,752,877 to Beavon, incorporated herein by reference, may be used to increase overall conversion to 99.9%-plus. This operation is also applicable in ammonia burning Claus sulfur plant as described in U.S. Pat. No. 4,038,036 to Beavon incorporated herein by reference.

The oxygen required to convert the hydrogen sulfide to sulfur dioxide is usually supplied with air. This results in the introduction of approximately 79 volumes of nitrogen for every 21 volumes of oxygen needed for oxidation of the hydrogen sulfide. The nitrogen does not benefit the process and actually results in having to use larger and more expensive equipment in the Claus sulfur plant. The amount of nitrogen passing through the plant may be reduced by employing pure oxygen or oxygen enriched air. However, this results in higher temperatures in the Claus reaction furnace and necessitates more expensive refractories and other materials of construction in new plants, whereas for existing plants it requires expensive changes in the design and operation of the plant.

The composition of the hydrogen sulfide gas stream will vary from plant to plant and may vary considerably during the life of the plant. In addition to the $H_2S$, the Claus plant feed gas may also contain varying amounts of ammonia, hydrocarbons, and other compounds which will react with oxygen and, therefore, affect the temperature increase in the Claus plant reaction furnace when making the change from air to oxygen enriched air up to pure oxygen.

While particularly applicable to new plants, the present invention is also directed to existing Claus sulfur plants in order to increase their capacity by the use of oxygen or oxygen enriched air.

SUMMARY OF THE INVENTION

According to the present invention, the capacity of a Claus sulfur plant, where the feed gas is a hydrogen sulfide rich feed gas stream, is increased by combusting hydrogen sulfide in two or more stages with an oxidant which is an oxygen rich gas stream comprised of oxygen or a mixture of air and oxygen. Only a portion of the oxidant is feed in a first combustion zone with all or a portion of a feed gas containing hydrogen sulfide. The proportions of the oxidant and the hydrogen sulfide rich feed streams are such that the combustion flame temperature in the first combustion zone is between about 1000° and about 3600° F. The reacted mixture of the oxidant and the hydrogen sulfide rich feed streams is cooled to a temperature between about 240° F. and about 3000° F. and is introduced with the remaining oxidant streams with any remaining portion of the hydrogen sulfide rich feed gas stream into at least one additional combustion zone in admixture with all or a portion of the cooled combustion products from the first combustion zone. Additional reaction occurs involving the oxygen contained in the remaining portion of the oxygen rich feed gas and the combustible species contained in the cooled combustion products from the first combustion zone and the combustible species contained in the remaining portion of the hydrogen sulfide rich feed gas whereby the combustion flame temperature in the second and any additional combustion chamber will be between about 1000° F. and about 3600° F. The use of at least two combustion zones in series and oxygen rich streams therein enables the processing of hydrogen sulfide containing gas streams at selected temperature ranges within the combustion zones. There is, in consequence, optimized the rapid conversion of hydrogen sulfide to sulfur dioxide while increasing the net sulfur producing capacity of a sulfur plant beyond that obtainable with the use of a single combustion zone.

BRIEF DESCRIPTION OF THE DRAWING

The attached drawing schematically illustrates a system to carry out the practice of the invention.

DETAILED DESCRIPTION OF THE DRAWINGS

As used herein by the term "hydrogen sulfide rich gas stream", there is meant gas streams containing at least about 10% by volume hydrogen sulfide and less than about 1000 parts per million by volume ammonia. By the term "ammonia rich gas stream", there is meant a gas stream containing at least about 1% by volume hydrogen sulfide and at least about 1000 parts per million by volume or more ammonia. By the term "oxygen rich gas stream" there is meant a substantially pure oxygen stream or air enriched with oxygen, to levels of about 30% by volume or more oxygen, preferably 50% by volume or more. Because oxygen rich gas streams are lean with respect to inert gases such as nitrogen, reaction temperatures within a combustion zone would, with a hydrogen sulfide rich gas stream and use of conventional Claus sulfur recovery units in the absence of the practice of the present invention, become excessively high, and for at least older sulfur plants, would reach the point where the refractory lining might be damaged.

To prevent damage to the flame zone of a conventional Claus sulfur recovery unit, there is utilized in the practice of the present invention at least two combustion zones with intermediate heat removal. As shown in the drawing, the modification of a Claus plant for practice of the invention involved addition of at least one heat exchanger and at least a second combustion zone.

By maintaining correct ratios of flow between streams to the combustion zones and with the intermediate heat removal step between combustion zones, the temperature in the combustion zones can be controlled within limits desirable for promoting the sulphur producing reactions and for protecting the refractory materials in the combustion zones from being damaged by high temperatures.

With reference to the Drawing, there is fed to the combustion zones 10 and 12 of cylindrical configuration and having head ends 14 and 16 and exit ends 18 and 20, a hydrogen sulfide rich gas stream in line 22 and oxygen rich gas streams in line 24 and 26. An ammonia rich gas stream may be fed to the combustion zones 10 and 12 in line 60 through 60a and if desired 60b. The amount of oxygen introduced is that required to form sulfur dioxide from hydrogen sulfide for the stoichiometric reaction:

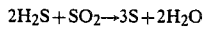

$$2H_2S + SO_2 \rightarrow 3S + 2H_2O$$

by which sulfur is formed. Carbonyl sulfide and carbon disulfide also tend to be formed.

The hydrogen sulfide rich gas stream 22 may be split into streams 22a and 22b. The split is determined by process considerations. In the preferred application of this invention division will be such that flow in line 22b will be low or non-existent. If an ammonia rich gas stream 60 is present, it may be split into streams 60a and 60b. The split is determined by process considerations. In the preferred application of this invention, division will be such that flow in line 60b will be low or non-existent. Use of an ammonia rich gas stream may increase the need to feed some of the hydrogen sulfide rich gas stream to combustion zone 12.

While the total oxygen necessary to operate the process is set by the requirement of the stoichiometric reaction shown above, the distribution of that total oxygen, i.e. the oxygen contained in streams 24 and 26, may be varied widely depending on hydrogen sulfide distribution and heat generation. Each stream is independently made up from either pure or substantially pure oxygen or a mixture of air and oxygen. Air and oxygen are respectively introduced into the process via streams 28a and 28b and streams 30a and 30b. The ratios of flow as between streams 28a, 28b, 30a and 30b are set by process considerations which, in the practice of this present invention, is to limit the combustion temperature in the combustion zones 10 and 12 in the range between a maximum of 3600° F. and a minimum of 1000° F.

The temperature in flame zones 10 and 12 are controlled within the desired range of 1000° F. to 3600° F. by properly setting the content of oxygen in streams 24 and 26 to the combustibles in stream 22a, 22b, 60a and 60b, and the effluent flowing from first flame zone 10 and through the heat exchanger 32 and passing by line 34 to second combustion zone 12. The proper setting of the oxygen/combustibles ratio of streams 24 and 26 will limit the temperature in the flame zone 10 by depriving a portion of the combustibles in flame zone 10 of oxygen. The intermediate heat removal in exchanger 32 will lower the temperature of the combustibles in stream 34 sufficiently such that when they react with the oxygen in stream 26, the resulting combustion temperature in flame zone 12 will be in the desired temperature range.

As should be apparent in the art, additional combustion zones with intermediate heat removal can be utilized with the same result, provided adequate measures are taken to control temperature in each to the range set forth above.

A portion of stream 34 may be removed from the process as stream 36 without deleterious effect of the practice of the present invention on the process, but in the preferred embodiment of the present invention a side stream is not withdrawn.

As indicated, a portion of the sulfur dioxide from oxidation of hydrogen sulfide reacts with hydrogen sulfide to form sulfur, and the product gas stream 37 is passed to heat exchanger 32 where any condensed sulfur is recovered. The same is true of heat exchanger 38. The bulk of condensation occurs in condenser 40 following which the residual gas stream is reheated in heater 42 to a temperature suitable for feeding by line 44 to catalytic conversion zone 46 containing a Claus catalyst. Suitable Claus catalysts may be alumina or bauxite. Additional sulfur is formed and the gas stream is passed to a second condenser 48, where it is separated from the gas stream. The gas stream may be reheated and passed to additional Claus stages, where more sulfur is formed. Typically, three catalytic Claus stages are employed. Any residual unreacted hydrogen sulfide and sulfide dioxide remaining in the gas stream may be processed to reduce such emissions in areas which require low emissions of sulfur to the atmosphere. A preferred process employed is described in U.S. Pat. No. 3,752,877.

In the presently preferred embodiment, the hydrogen sulfide rich gas stream, the ammonia rich gas stream, if present, and the oxygen rich gas stream are injected by means of tangential burners 50 and 52 to initiate the combustion of hydrogen sulfide.

The amount of oxygen fed can be varied as required depending on plant capacity and on the percent of $H_2S$ in the acid gas feed.

The control of the oxygen rich gas streams can be independently accomplished by meters and flow controllers. Temperature monitoring instruments 54 and 56 for the flame zones 10 and 12 can be used to alarm for high and low temperature readings over the working range.

The use of double combustion is effective for gas streams containing about 30% or more by volume $H_2S$ and usually required for hydrogen sulfide rich gases containing above about 50% by volume $H_2S$ with 100% by volume $O_2$ used for combustion or for hydrogen sulfide rich gases containing 90% or more by volume $H_2S$ or close thereto with oxygen contents above about 30% by volume $O_2$ in the oxygen rich gas streams.

It may also be advantageous to use the process for cooling in cases where the sulfur plant feed stream contains a high amount of hydrocarbons or other oxidizable constituents such as ammonia.

EXAMPLE

An existing Claus unit operated on air is 30,829 lbs/hr. of acid gas feed having a hydrogen sulfide concentration of about 90% by volume. If pure oxygen were substituted for air, the refractory lining of the combustion chamber would not withstand the resulting high reaction temperature of about 4500° F. To reduce reaction temperature to about 2975° F., well below the maximum temperature limitation of the refractory, there is employed two combustion units in series with intermediate heat removal. Acid gas feed capacity is increased to 70,323 lbs/hr. for an increase of 129% in the sulfur producing capacity of the plant. The main flows are listed in the table below wherein all of the acid gas is fed to the first combustion zone with oxygen divided to maintain combustion zone temperatures below 3,000° F.

TABLE I

|  | Claus Plant With Air | Same Claus Plant With Oxygen & Double Combustion |
|---|---|---|
| Total Acid Gas Feed - lbs/hr. | 30,829 | 70,323 |
| Air - lbs/hr. | 71,026 | — |
| Pure Oxygen - lbs/hr. | — | 37,148 |
| Total - lbs/hr. | 101,855 | 107,471 |
| First Combustion Zone | 2,600° F. | 2,950° F. |
| Second Combustion Zone Temperature | — | 2,975° F. |
| Sulfur in Acid Gas Feed - lbs/hr. | 20,221 | 46,124 |
| Net Sulfur Produced - lbs/hr. | 19,375 | 44,339 |
| Increase in Sulfur Produced | — | 129% |

What is claimed is:

1. In a process for the production of sulfur by reaction of hydrogen sulfide and sulfur dioxide wherein a feed of hydrogen sulfide is oxidized in part to sulfur dioxide to form reactants which yield sulfur by the modified catalytic Claus reaction, the improvement which comprises:
   (a) introducing to a first combustion zone at least a portion of a hydrogen sulfide rich gas stream containing at least about 10% by volume hydrogen sulfide and a first oxygen rich gas containing at least about 30% by volume oxygen in a proportion to achieve by combustion a first sulfur dioxide containing product gas stream at a combustion flame temperature of from about 1000° F. to about 3600° F.;
   (b) cooling the first product gas stream to a temperature from about 240° F. to about 3000°; and
   (c) introducing the cooled first product gas stream to at least a second combustion zone with additional oxygen rich gas stream containing at least about 30% by volume oxygen to combust additional hydrogen sulfide and yield a second sulfur dioxide containing product gas stream at a combustion flame temperature of from about 1000° F. to about 3600° F., the amount of hydrogen sulfide and oxygen fed to the combustion zones being proportioned to provide on completion of combustion a gas stream having a mole ratio of hydrogen sulfide to sulfur dioxide of about 2:1 for feed to a catalytic Claus convertor to achieve formation of sulfur by reaction of residual hydrogen sulfide with sulfur dioxide formed during combustion in the combustion zones.

2. A process as claimed in claim 1 in which all or substantially all of the hydrogen sulfide rich gas stream is fed to the first combustion zone.

3. A process as claimed in claim 1 in which the hydrogen sulfide rich gas stream contains at least about 50% by volume hydrogen sulfide.

4. A process as claimed in claim 2 in which the hydrogen sulfide rich gas stream contains at least about 50% by volume hydrogen sulfide.

5. A process as claimed in claim 1 in which an ammonia rich gas stream containing at least about 1 percent by volume hydrogen sulfide and 1000 parts per million per volume ammonia is fed at least to the first combustion zone.

6. A process as claimed in claim 2 in which an ammonia rich gas stream containing at least about 1 percent by volume hydrogen sulfide and 1000 parts per million per volume ammonia is fed at least to the first combustion zone.

7. A process as claimed in claim 3 in which an ammonia rich gas stream containing at least about 1 percent by volume hydrogen sulfide and 1000 parts per million per volume ammonia is fed at least to the first combustion zone.

8. A process as claimed in claim 1 in which the oxygen rich gas stream is substantially pure oxygen.

9. A process as claimed in claim 3 in which the oxygen rich gas stream is substantially pure oxygen.

10. A process as claimed in claim 4 in which the oxygen rich gas stream is substantially pure oxygen.

11. In a process for the production of sulfur by reaction of hydrogen sulfide and sulfur dioxide wherein a feed of hydrogen sulfide is oxidized in part to sulfur dioxide to form reactants which yield sulfur by the modified Claus reaction, the improvement which comprises:
    (a) introducing to a first combustion zone at least a portion of a hydrogen sulfide rich gas stream containing at least about 10% by volume hydrogen sulfide and an oxygen rich gas containing at least about 30% by volume oxygen in an amount sufficient to achieve by combustion a first product gas stream comprising hydrogen sulfide and sulfur dioxide at a combustion flame temperature of from about 1000° F. to about 3600° F.;
    (b) cooling the first product gas stream to a temperature from about 240° F. to about 3000° F.;
    (c) introducing the cooled first product gas stream to a second combustion zone with additional oxygen rich gas stream containing at least about 30% by volume oxygen to combust additional hydrogen sulfide to sulfur dioxide and yield a second product gas stream at a combustion flame temperature of from about 1000° F. to about 3600° F. in which the mole ratio of hydrogen sulfide to sulfur dioxide is about 2:1; and
    (d) passing the second product gas stream to a catalytic Claus convertor to form sulfur by reaction of formed sulfur dioxide with residual hydrogen sulfide.

12. A process as claimed in claim 11 in which all or substantially all of the hydrogen sulfide rich gas stream is fed to the first combustion zone.

13. A process as claimed in claim 11 in which the hydrogen sulfide rich gas stream contains more than 50% by volume hydrogen sulfide and in which the oxygen rich gas stream is substantially pure oxygen.

14. A process as claimed in claim 12 in which the hydrogen sulfide rich gas stream contains more than 50% by volume hydrogen sulfide and in which the oxygen rich gas stream is substantially pure oxygen.

15. A process as claimed in claim 11 in which the hydrogen sulfide rich gas stream contains more than 90% by volume hydrogen sulfide.

16. A process as claimed in claim 12 in which the hydrogen sulfide rich gas stream contains more than 90% by volume hydrogen sulfide.

17. A process as claimed in claim 11 in which the oxygen rich gas stream and the hydrogen sulfide rich gas stream are tangentially introduced to each combustion zone.

18. A process as claimed in claim 12 in which the oxygen rich gas stream and the hydrogen sulfide rich gas stream are tangentially introduced to each combustion zone.

19. A process as claimed in claim 11 in which an ammonia rich gas stream containing at least about 1 percent by volume hydrogen sulfide and 1000 parts per million per volume ammonia is fed at least to the first combustion zone.

20. A process as claimed in claim 12 in which an ammonia rich gas stream containing at least about 1 percent by volume hydrogen sulfide and 1000 parts per million per volume ammonia is fed at least to the first combustion zone.

* * * * *